United States Patent [19]

Carten

[11] Patent Number: 4,867,201

[45] Date of Patent: Sep. 19, 1989

[54] PARALLEL-MOTION DUAL-DIAPHRAGM VALVE

[75] Inventor: Daniel J. Carten, Woodbury, Conn.

[73] Assignee: Harsco Corporation, Wormlesburg, Pa.

[21] Appl. No.: 319,568

[22] Filed: Mar. 6, 1989

[51] Int. Cl.[4] .............................................. F17D 5/04
[52] U.S. Cl. .............................. 137/625.18; 137/594; 251/331; 251/335.2; 251/77
[58] Field of Search ..................... 137/625.18, 625.28, 137/625.29, 625.33, 625.3, 594, 312; 251/331, 335.2, 77

[56] References Cited

U.S. PATENT DOCUMENTS

| | | | |
|---|---|---|---|
| 1,771,410 | 7/1930 | Landis | 251/331 X |
| 2,301,428 | 11/1942 | MacNeil | 137/625.18 X |
| 2,845,084 | 7/1958 | Detlefson | 251/335.2 X |
| 3,057,378 | 10/1962 | Fennema et al. | 137/594 X |
| 3,614,057 | 10/1971 | Hospe | 251/331 X |
| 4,010,769 | 3/1977 | DeLorenzo et al. | 251/335.2 X |
| 4,070,004 | 1/1978 | Friswell | 251/331 |
| 4,750,709 | 6/1988 | Kolnec et al. | 251/335.2 |

*Primary Examiner*—John Rivell
*Attorney, Agent, or Firm*—Sommer & Sommer

[57] ABSTRACT

A valve (10) has a body (11) provided with two separate but parallel flow passages therethrough. A first diaphragm assembly (14) is held between a lower bonnet (12) and the body, and is movable toward and away from a seat (48). A second diaphragm assembly (15) is held between an upper bonnet (13) and the body. A follower (16) is arranged between the diaphragms. An actuator (20) is arranged to cause substantially parallel motion of the diaphragms in response to movement of the actuator.

7 Claims, 2 Drawing Sheets

PARALLEL-MOTION DUAL-DIAPHRAGM VALVE

TECHNICAL FIELD

The present invention relates generally to the field of valves, and, more particularly, to an improved dual-diaphragm valve for use in a dual-containment fluid handling system.

BACKGROUND ART

In certain fluid-handling systems, it is necessary to maintain a high degree of purity in the serviced fluids (i.e., liquids or gases). To this end, certain hermetically-sealed single-diaphragm valves, such as the "SPD TM" valve manufactured by Carten Systems, Inc., Middlebury, Conn., have been developed. These valves have a body provided with a flow passageway therethrough. An annular seat surrounds a portion of this passageway. A metal diaphragm assembly is movable toward and away from the seat, and forms a flexible wall portion of the flow passageway.

However, in such systems and or in other systems in which the serviced fluid is toxic or noxious, there is a need to provide a redundant or secondary fluid-containment system which surrounds the primary containment system. Hence, should the primary containment system leak for any reason, the escaping gas will leak into the secondary containment system, and will be prevented from entering the atmosphere.

Such dual-containment systems, while affording the capability of redundant protection against leakage and contamination, present special problems with respect to the design of valves and actuators therefor, for the desired mechanical movement must sealingly penetrate the outer containment system without adversely affecting its fluid-tight sealed integrity.

DISCLOSURE OF THE INVENTION

Accordingly, the present invention provides an improved diaphragm-type valve for use in such a dual-containment fluid handling system.

The improved valve broadly includes: a body having a first passageway extending between an inlet and an outlet and having a second passageway extending between first and second ends; a seat mounted on the body and arranged to surround a portion of the first passageway; a first diaphragm assembly mounted on the body for movement toward and away from the seat so as to form a flexible wall separating the primary and secondary containment systems; a second diaphragm assembly mounted on the body so as to form a flexible wall portion of the second passageway; a follower movably mounted on the body so as to have one end arranged to engage the first diaphragm assembly and have another end arranged to engage the second diaphragm assembly; and an actuator operatively arranged to selectively move the second diaphragm assembly in such a manner that the first diaphragm assembly will be moved toward and away from the seat.

Accordingly, the general object of this invention is to provide an improved parallel-motion dual-diaphragm valve.

Another object is to provide an improved valve for use in a dual-containment fluid handling system.

Still another object is to provide an improved valve for a dual-containment fluid handling system, in which a mechanical motion is transmitted through the outer containment wall without sacrificing the sealed integrity of either system.

These and other objects and advantages will become apparent from the foregoing and ongoing written specification, the drawings, and the appended claims.

MODE(S) OF CARRYING OUT THE INVENTION

Figure 2:
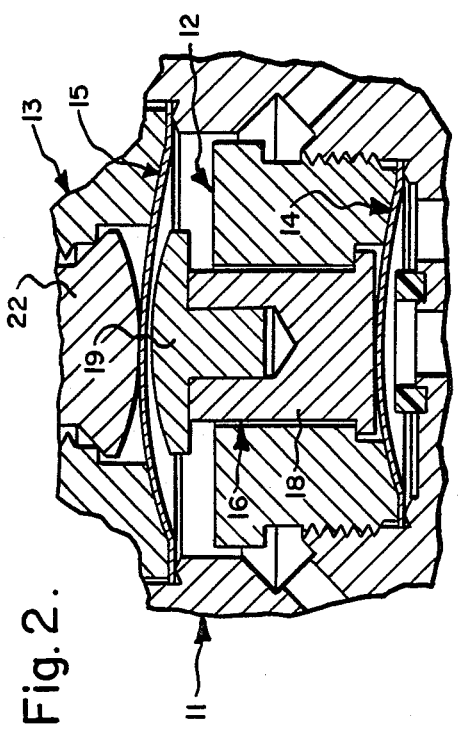
FIG. 2 is an enlarged fragmentary detail view of the two diaphragm assemblies and the intermediate follower, this view showing the first diaphragm assembly as being separated from the seat so as to permit a flow of fluid through the first passageway.

At the outside, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, arrangement of parts, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Figure 1:
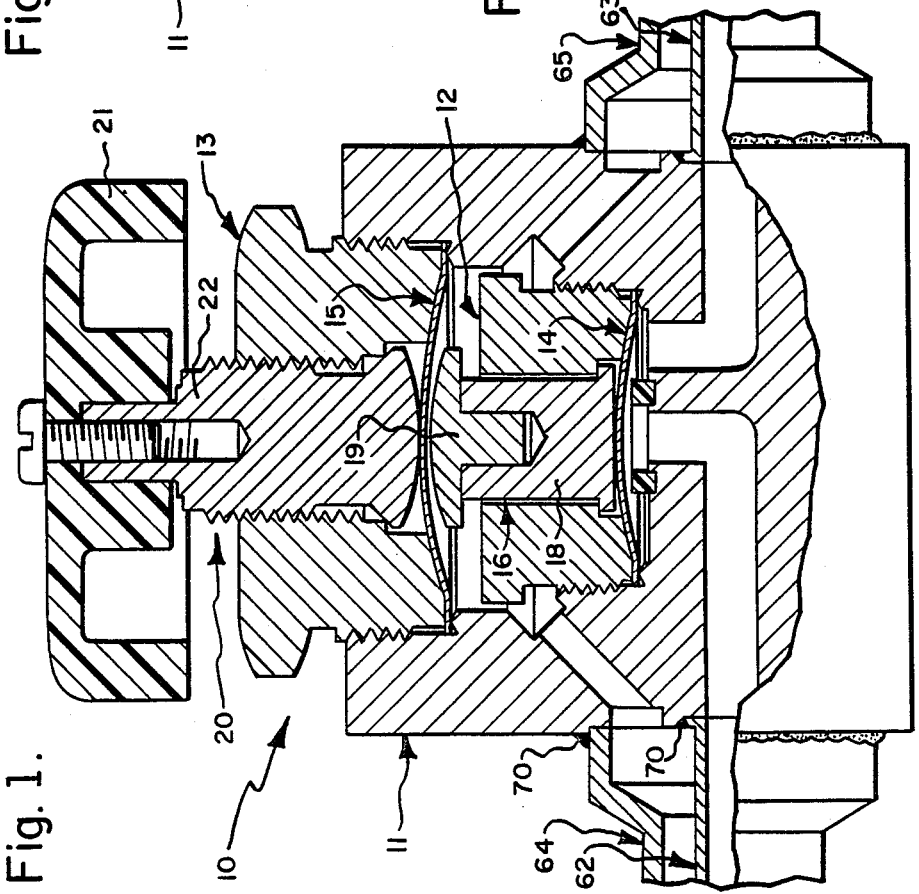
FIG. 1 is a fragmentary longitudinal vertical sectional view of the presently-preferred embodiment of the improved valve, showing the first and second passageways, the first and second diaphragm assemblies, the follower arranged between the diaphragms, and the actuator.
Figure 4:
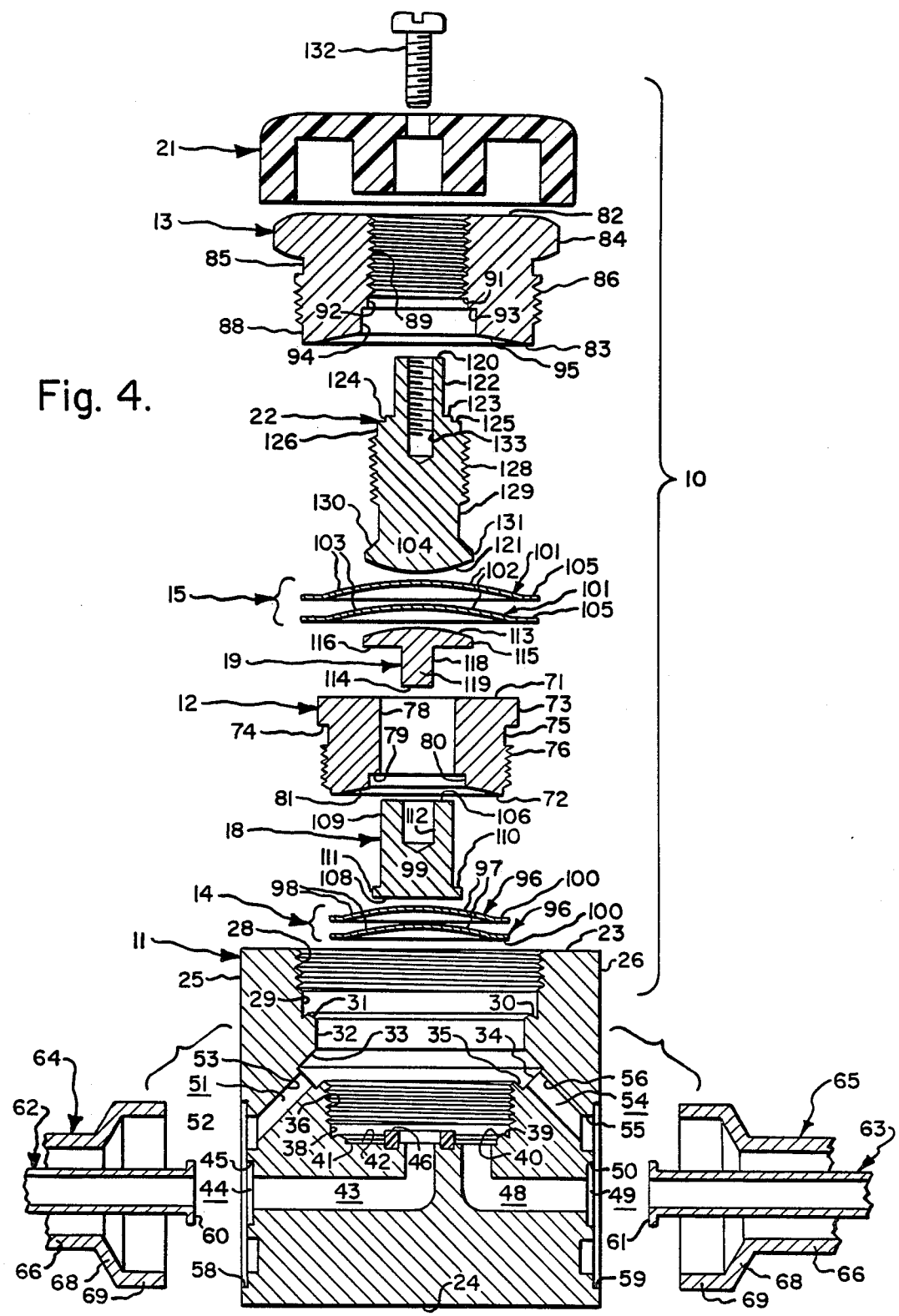
FIG. 4 is an exploded view of the improved valve.

Referring now to the drawings, and, more particularly to FIGS. 1 and 4 thereof, this invention provides an improved dual-diaphragm valve, generally indicated at 10. The presently-preferred form of the improved valve is shown as broadly including a body 11; a first or lower bonnet 12 mounted on the body; an upper or second bonnet 13 mounted on the body; a lower or first diaphragm assembly 14 operatively held between the body and the first bonnet; an upper or second diaphragm assembly 15 operatively arranged between the body and the second bonnet; a two-part follower, generally indicated at 16 (FIG. 1), which includes a lower portion 18 and an upper cap portion 19, mounted on the first bonnet for vertical sliding movement relative thereto with the motion of the diaphragms; and an upper actuator, generally indicated at 20 (FIG. 1), including a hand wheel 21 and stem 22 rotatably mounted on the upper bonnet.

As best shown in FIG. 4, body 11 is a specially-configured member. The body is preferably formed of 316 stainless steel, although this material may be readily changed or varied as desired. The body is generally block-like, and has rectangular planar horizontal upper and lower faces 23,24, respectively, and planar rectangular vertical left and right faces 25,26, respectively. A relatively large diameter central recess is shown as extending downwardly into the body from its upper face 23. More particularly, this recess is sequentially bounded by: an internally-threaded portion 28 extending downwardly from body upper face 23, an inwardly-facing vertical cylindrical surface 29, an upwardly- and outwardly-facing frusto-conical surface 30, an upwardly- and inwardly-facing frusto-conical surface 31, an inwardly-facing vertical cylindrical surface 32, a downwardly- and inwardly-facing frusto-conical surface 33, an upwardly-and inwardly-facing frusto-conical surface 34, an upwardly- and outwardly-facing frusto-conical surface 35, an internally-threaded portion 36 extending downwardly therefrom, an inwardly-facing vertical cylindrical surface 38, an upwardly- and outwardly-facing frusto-conical surface 39, an upwardly- and inwardly-facing frusto-conical surface 40, and an inwardly-facing vertical cylindrical surface 41 continuing downwardly therefrom to join an upwardly-facing horizontal annular bottom surface 42 of the recess.

An L-shaped first inlet passageway 43 has a horizontal portion communicating with body left face 25 to form an inlet 44, and has a vertical portion extending upwardly therefrom to communicate axially with recess bottom surface 42. An annular recess 45 is shown as extending rightwardly into the body from left face 25 so as to surround the inlet. An upwardly-facing annular groove extends downwardly into the body from recess bottom surface 42 so as to concentrically encircle or surround the mouth of the first inlet passageway, and to receive and accommodate a ring-like seat member 46. In the preferred embodiment, the seat member is formed of a suitable polymer, such as Kel-F ®, although the material of which the seat member is formed may be readily changed.

An L-shaped first outlet passageway 48 has a vertical portion extending downwardly from an eccentric location on recess bottom surface 42, and has a horizontal portion extending rightwardly therefrom to form an outlet 49 at its intersection with body right face 26. An annular recess 50 is shown as extending leftwardly into the body from right face 26 to surround the outlet.

The body is shown as further including a second passageway having left and right portions communicating with the body central recess. The left portion 51 includes an annular groove 52 extending rightwardly into the body from left face 25 so as to be concentric with first passageway inlet recess 45, and an inclined hole 53 intersecting groove 52 and extending upwardly and rightwardly therefrom to intersect central recess surface 34. Thus, this second passageway left portion communicates body left face 25 with the body central recess. The second passageway right portion 54 includes an annular groove 55 extending leftwardly into the body from right face 26 so as to be concentric with first passageway outlet recess 50, and an inclined hole 56 intersecting the bottom of groove 55 and extending upwardly and leftwardly therefrom to intersect central recess surface 34 at a location diametrically opposite the intersection of hole 53 therewith.

A large diameter annular recess 58, concentric with inlet recess 45, extends rightwardly into the body from left face 25 so as to encompass and surround grooves 45,52. Conversely, another large diameter recess 59, concentric with outlet recess 50, extends leftwardly into the body from right face 26 to encompass and surround grooves 50,55. The first passage inlet and outlet recesses 44,49 are provided to accommodate and receive the flanged marginal end portions 60,61 of left and right inner tubes 62,63, respectively. Tubes 62,63 are shown as being horizontally aligned with one another, and as being structurally identical except that one is arranged as a mirror image of the other. Similarly, large diameter recesses 58,59 are provided to accommodate and receive the marginal end portios of left and right outer tubes 64,65, which are concentric with and encircle inner tubes 62,63, respectively. The outer tubes are severally shown as having a substantially-constant wall thickness, and as having a main horizontally-elongated tubular potion 66 arranged in concentric spaced relation to inner tubes 62,63, a frusto-conical divergent portion 68, and an enlarged-diameter tubular portion 69 continuing axially therefrom toward the appropriate tube end face which is adapted to be received in body recesses 58,59. Tubes 62,63,64,65 may be severally formed of 316 stainless steel, if desired. Each of tubes 62,63,64,65 is adapted to be mounted on, and hermetically sealed to, the body by means of continuous peripheral weldments, severally indicated at 70 in FIG. 1.

Lower bonnet 12 is depicted as being a vertically-elongated specially-configured member having annular horizontal upper and lower end faces 71,72, respectively, and an outer surface which sequentially includes: an outwardly-facing vertical cylindrical surface 73 extending downwardly from upper end face 71, a downwardly-facing annular horizontal surface 74, an outwardly-facing vertical cylindrical surface 75, and an externally-threaded portion 76 continuing downwardly therefrom to join lower end face 72. Bonnet threaded portion 76 is adapted to mate with body threaded portion 36, with bonnet surface 73 being arranged in spaced facing relatio to body recess surface 32. If desired, one of threaded portions 36,76 may be provided with a longitudinally-extending grroove or slot (not shown) to provide a deliberate leakage path past the mating threads. This bonnet may be provided with a suitable polygonal surface or recess (not shown) to facilitate its rotation relative to the body. The bonnet is shown as further including a stepped vertical through-bore, which sequentially includes: an inwardly-facing vertical cylindrical surface 78 extending downwardly from upper end face 71, a downwardly-facing annular horizontal surface 79, an inwardly-facing vertical cylindrical surface 80, and a downwardly- and inwardly-facing annular spherically-segmented surface 81 continuing downwardly and outwardly therefrom to join the inner margin of lower end face 72. The lower bonnet is preferably formed of brass, although this material is not deemed to be critical, and may be changed or varied as desired.

Upper bonnet 13 is also shown as being a vertically-elongated specially-configured member, and has annular horizontal upper and lower end faces 82,83, respectively, and an outer surface which sequentially includes: an outwardly-facing polygonal surface 84 extending downwardly from upper end face 82, an outwardly-facing vertical cylindrical surface 85, an externally-threaded portion 86, and an outwardly-facing vertical cylindrical surface 88 continuing downwardly therefrom to join lower end face 83. Threaded portion 86 is adapted to mate with body threads 28. Upper bonnet 13 is shown as also including an axial through-bore, which is sequentially bounded by: an internally-threaded portion 89 extending downwardly from upper face 82, a downwardly-facing annular horizontal surface 91, an inwardly-facing vertical cylindrical surface 92, a downwardly-facing annular horizontal surface 93, an inwardly-facing vertical cylindrical surface 94, and a downwardly- and inwardly-facing annular spherically-segmented surface 95 continuing downwardly and outwardly therefrom to join the inner margin of lower end face 83. The upper bonnet is adapted to be threadedly engaged with the body such that, upon selective rotation of the bonnet relative to the body, the bonnet lower end face 83 will move toward and away from body recess surfaces 30,31. The upper bonnet is also preferably formed of brass, but this material may be changed as desired.

Figure 3:
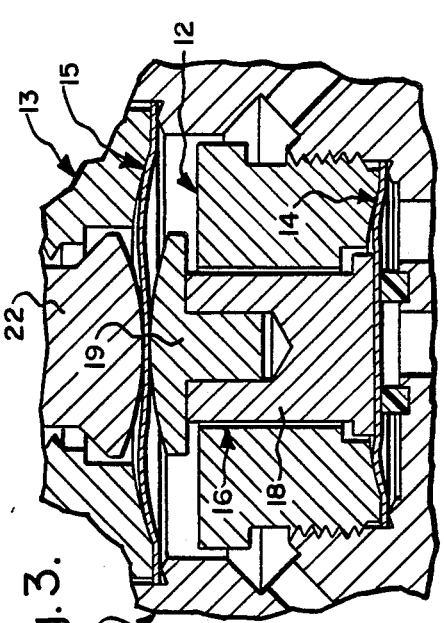
FIG. 3 is an enlarged fragmentary detail view similar to FIG. 2, but shows the first diaphragm assembly as having been moved downwardly into fluid-tight sealed engagement with the seat so as the prevent flow through the first passageway.

The lower diaphragm assembly 14 is shown as including a pair of diaphragms, severally indicated at 96. These two diaphragms are structurally identical, and are adapted to nest or interfit with one another. The diaphragms are preferably formed of 316 stainless steel, or equivalent. Each diaphragm is shown as having a central domed portion 97 defined between an upwardly-facing convex surface 98 and a downwardly-facing concave surface 99. Moreover, an integrally-formed annular flange portion 100 is shown as extending horizontally outwardly from the outer margin of the central domed portion. The shape and configuration of each diaphragm 14 thus imparts an integral spring function to its central domed portion, which spring function urges the domed portion to return to the undeflected bowed shape shown in FIG. 4. Diaphragms 96,96 are adapted to nest with one another, as shown in FIGS. 1-3, and to be positioned within the body recess such that the downwardly-facing annular horizontal surface of the flange portion of the lowermost diaphragm, will rest upon the upwardly-facing circular line defined by the intersection of body recess surfaces 39,40. Hence, when the lower bonnet 12 is threaded into engagement with the body, the bonnet lower end face 72 is adapted to bear against the upwardly-facing annular horizontal surface of the uppermost diaphragm 14, and thereby cause such flange portions to be compressively deformed into fluid-tight conformal deformation with the line defined by the intersection of body surfaces 39,40. While the preferred embodiment employs two of diaphragms 96 in such interfitting relationship, diaphragm assembly 14 may typically include, but is not limited to, anywhere from two to five of diaphragms 96.

The upper diaphragm assembly 15 is shown as also including a pair of diaphragms, severally indicated 101. These two diaphragms are structurally identical, and are also adapted to nest with one another. The upper diaphragms are also preferably formed of 316 stainless steel or equivalent. Each upper diaphragm 101 has a central domed portion 102 defined between an upwardly-facing convex surface 103 and a downwardly-facing concave surface 104. As with the lower diaphragms, each upper diaphragm 101 is configured to have an integrally-formed annular flange portion 105 extending horizontally outwardly from its central domed portion. The shape of the upper diaphragm also imparts an integral spring function its domed portion, which spring function urges it to remain in the undeflected bowed shape shown in FIG. 4. Diaphragms 101,101 are also adapted to nest with one another, as shown in FIGS. 1-3, and to be positioned within the body recess such that the downwardly-facing annular horizontal surface of the lowermost diaphragm flange portion, rests upon the upwardly-facing circular line defined by the intersection of body recess surfaces 30,31. Thus, when the upper bonnet 13 is threaded into engagement with the body, the bonnet lower end face 83 is adapted to bear against the upwardly-facing annular horizontal surface of the uppermost diaphragm 101. Hence, when the upper bonnet is tightened relative to the body, it will cause such flange portions to be deformed into fluid-tight conformal deformation with the circular line defined by the intersection of body surfaces 30,31. Again, while the preferred embodiment is shown as incorporating two of diaphragms 101, the upper diaphragm assembly 15 may typically include, but is not limited to, anywhere from two to five of such diaphragms.

As previously noted, the follower 16 includes a lower portion 18, and a button-like upper or cap portion 19. Both of these follower portions may be formed of brass, but this material may be changed in accordance with the serviced fluid(s). The lower portion 18 is shown as having an annular horizontal upper end face 106, a circular horizontal lower end face 108, and a stepped outer surface which sequentially includes: an outwardly-facing vertical cylindrical surface 109 extending downwardly from upper end face 106, an upwardly-facing annular horizontal surface 110, and outwardly-facing vertical cylindrical surface 111 continuing downwardly therefrom to join lower end face 108. The annular lug (i.e., defined between surfaces 108, 110 and 111) extending radially outwardly from surface 109 adjacent the lower end face of the follower lower portion 18, provides a stop member on the follower which is arranged to selectively engage lower bonnet surface 79 to limit movement of the follower away from seat 46. Moreover, a blind axial hole 112 is shown as having been drilled downwardly into lower portion 18 from its upper end face 106 to receive and accommodate the depending stem of follower upper portion 19.

The follower upper portion 19 is shown as being a button-like solid member having a convex spherically-segmented upper end face 113, a circular horizontal lower end face 114, and an outer surface which sequentially includes: an outwardly-facing cylindrical surface 115 extending downwardly from the outer margin of upper face 113, a downwardly-facing annular horizontal surface 116, and an outwardly-facing vertical cylindrical surface 118 continuing downwardly therefrom to join lower end face 114. The follower upper portion thus has a depending cylindrical stem 119, which is adapted to be loosely received in follower lower portion hole 112. The lower end face 108 of follower lower portion 18 is adapted to bear against the uppermost surface 98 of the lowermost diaphragm central domed portion.

The actuator 20 is shown as including a handwheel 21 and a stem 22 rotatably mounted on the upper bonnet. The handwheel is entirely conventional, and therefore need not be specifically described. Stem 22, which is also preferably formed of brass or equivalent, is shown as having an annular horizontal upper end face 120, a downwardly-facing spherically-segmented lower end face 121, and a stepped outer surface which sequentially includes: an outwardly-facing square surface 122 extending downwardly from upper end face 120, an upwardly-facing annular horizontal surface 123, an outwardly-facing vertical cylindrical surface 124, an upwardly-facing annular horizontal surface 125, an outwardly-facing vertical cylindrical surface 126, an externally-threaded portion 128, an outwardly-facing vertical cylindrical surface 129, and an upwardly- and outwardly-facing frusto-conical surface 130, and an outwardly-facing vertical cylindrical surface 131 continuing downwardly therefrom to join lower end face 121. Handwheel 21 is secured to the stem 22 by means of a screw 132 received in an axial tapped blind hole 133 extending downwardly into the stem from its upper face 120.

The improved valve is assembled as shown in FIG. 1, with the lower diaphragm assembly 14 being compressively sandwiched between lower bonnet 12 and the circular line defined by the intersection of body surfaces 39,40, and with the upper diaphragm assembly 15 being compressed between upper bonnet 13 and the circular line defined by the intersection of body surfaces 30,31. Thus, the nested flange portions of the two diaphragms are compressed into fluid-tight sealed engagement between the body and the associated bonnet. Hence, the lower diaphragm assembly forms a flexible or movable wall portion of the first passageway communicating inlet 44 with outlet 49, and the upper and lower diaphragm assemblies form two separate movable wall portions of the second passageway communicating grooves 52,55.

Follower 16 is mounted on the lower bonnet for vertical sliding movement relative thereto. The lower end face 108 of the follower lower portion is arranged to engage the convex upper surface 98 of the uppermost diaphragm of the lower diaphragm assembly 14, while the upper end face 113 of the follower cap portion is arranged to engage the convex lower surface of the lowermost diaphragm of the upper diaphragm assembly 15. Moreover, the vertical spacing between follower upper and lower faces 113,108 is substantially the same, or only slightly less than, the vertical spacing between the undeformed domed portions of the two diaphragm assemblies, all with the object that such domed portions will bend or flex in a parallel manner and substantially simultaneously. Moreover, the effects of the various diaphragm spring functions are additive with respect to the amount of force which the actuator must exert to deform the diaphragm domed portions.

The handwheel may then be grasped and rotated in the appropriate direction to cause the stem lower face 121 to engage and bear against the upper diaphragm assembly 15. If the stem lower face is moved downwardly, it will deform the flexible domed portion of the upper diaphragms. Such motion will also be transmitted through the follower to cause a like deforming motion of the lower diaphragm assembly, as shown in FIG. 3. When the handwheel is rotated in the opposite direction such that stem lower face 121 moves upwardly, the integral spring function of the diaphragms will urge their central domed portions to return to the undeflected bowed shape shown in FIG. 4.

Thus, the invention provides an improved parallel-motion dual-diaphragm valve which is particularly adapted for use in a redundant fluid-containment system. After tubes 62,63,64,65 have been hermetically sealed to the body, as by weldments 70, fluid may be supplied to the valve through inner inlet tube 62. The position of the lower diaphragm assembly relative to seat 46 may be changed by selective rotation of handwheel 21 to meter the flow of fluid through the first passageway from the inlet 44 to outlet 49.

The annular space between the inner and outer tubes may be put to various further uses. The inlet and outlet of the secondary passageway remain in continuous communication with one another, wholly independently of the position of the lower diaphragm assembly 14 relative to the seat. This annular space may, for example, communicate with suitable detecting apparatus (not shown) to detect the presence of leaked first fluid. If desired, a second fluid (i.e., either a liquid or a gas) may continuously flow through the second passageway and through the annular space between the inner and outer tubes. Still further, the second passageway and the annular space between the tubes may be pressurized positively with respect to the first fluid within the inner tube, such that in the event of a leak in the primary containment wall (i.e., the inner tube, or the sealed joint between such tube and the body, or the body itself) the encircling second fluid will leak into the confined first fluid. Alternatively, such annular space may be evacuated, if desired.

MODIFICATIONS

The present invention expressly contemplates that various changes and modifications may be made.

For example, the materials of construction are dictated largely by the serviced fluid(s), and may be readily changed or modified as desired. The shape and configuration of the various parts and components may be readily changed. For example, the stem could have an insert, somewhat analogous to cap member 19, loosely received therein, such that rotation of the stem would not abrade or erode the uppermost diaphragm. Conversely, such cap member could be eliminated from follower 16. The particular number of diaphragms in each diaphragm assembly may be changed to suit varying conditions. If the domed portion(s) of the diaphragms are relatively flexible, it may be desirous to add a return spring capable of acting between the lower bonnet and the follower, to phyically displace the follower upwardly when the actuator is retracted, and to permit the diaphragms to return toward their undeflected shapes.

It should also be readily apparent that the actuator is not limited to a manually-rotatable handwheel. Other types of manually- and automatically-operable actuators may be substituted therefor. Thus, the actuator may be mechanical, hydro-mechanical, pneumo-mechanical, fluidic, electrical, or the like, all as desired.

Therefore, while the presently-preferred embodiment of the improved valve has been shown and described, and several modifications and changes thereof discussed, persons skilled in this art will readily appreciate that various additional changes and modifications may be made without departing from the spirit of the invention, as defined and differentiated by the following claims.

I claim:

1. A valve, comprising:
    a body having a first passageway extending between an inlet and an outlet and having a second passageway extending between first and second ends;
    a seat mounted on said body and arranged to surround a portion of said first passageway;
    a first diaphragm mounted on said body for movement toward and away from said seat;
    a second diaphragm mounted on said body so as to form a flexible wall portion of said second passageway;
    a follower slidably mounted on said body so as to have one end arranged to engage said first diaphragm and have another end arranged to engage said second diaphragm, said follower having a stop arranged to selectively engage a portion of said body to limit movement of said follower away from said seat; and an actuator operatively arranged to selectively move said second diaphragm in such a manner that said first diaphragm will be moved toward and away from said seat.

2. A valve as set forth in claim 1 wherein said first diaphragm forms another flexible wall portion of said second passageway.

3. A valve as set forth in claim 1 wherein said first diaphragm has an integral spring portion which urges said first diaphragm to move away from said seat.

4. A valve as set forth in claim 1 wherein said second diaphragm has an integral spring portion which urges said second diaphragm to move toward said actuator.

5. A valve set forth in claim 1 wherein said first diaphragm sealing separates said first and second passageways.

6. A valve as set forth in claim 1 wherein said actuator includes a stem threadedly mounted on said body and having an end face arranged to move toward and away from said seat.

7. A valve as set forth in claim 1 wherein said first and second ends of said second passageway remain in continuous communication with one another regardless of the position of said first diaphragm relative to said seat.

* * * * *